United States Patent

Malhi et al.

[11] Patent Number: 5,971,637
[45] Date of Patent: Oct. 26, 1999

[54] LOW PROFILE KEYBOARD

[75] Inventors: Satwinder Malhi, Garland; Bruce D. Quinney; Craig A. Fischer, both of Plano, all of Tex.

[73] Assignee: Texas Instruments Incorporated, Dallas, Tex.

[21] Appl. No.: 08/762,895

[22] Filed: Dec. 10, 1996

[51] Int. Cl.⁶ .................................. B41J 5/14; B41J 5/16
[52] U.S. Cl. ........................ 400/491.2; 400/490; 361/680
[58] Field of Search ..................... 400/491, 490, 400/491.2; 361/680

[56] References Cited

U.S. PATENT DOCUMENTS

| | | | |
|---|---|---|---|
| 5,268,545 | 12/1993 | Bruner | 400/491.2 |
| 5,594,617 | 1/1997 | Foster et al. | 361/680 |
| 5,602,715 | 2/1997 | Lempicki et al. | 361/680 |
| 5,635,928 | 6/1997 | Takagi et al. | 361/680 |

OTHER PUBLICATIONS

IBM Technical Disclosure Bulletin, vol. 39, No. 2, Thin Keyboard Structure for Notebook Personal Computer, Feb. 1996.

*Primary Examiner*—Edgar S. Burr
*Assistant Examiner*—Daniel J. Colilla
*Attorney, Agent, or Firm*—Ronald O. Neerings; James C. Kesterson; Richard L. Donaldson

[57] ABSTRACT

A notebook computer (100) or other electronic device has a keyboard (106) using keys (40, 80) which can assume an active state for typing while a spring (64, 84) is pressed against a guide mechanism (44). By disengaging the spring (64, 84) from the guide mechanism, the keys (40, 80) assume a storage state at a lower height.

20 Claims, 5 Drawing Sheets

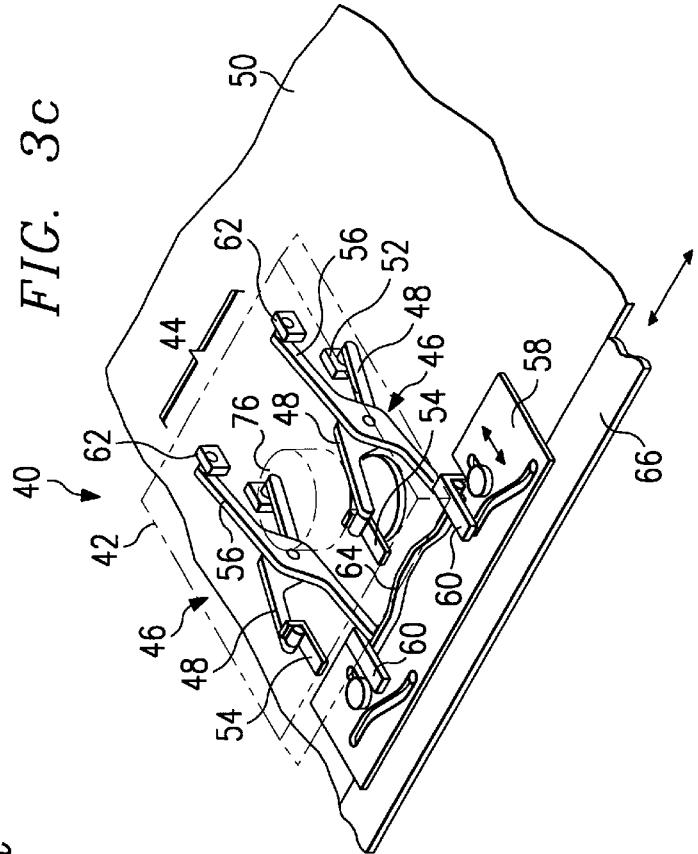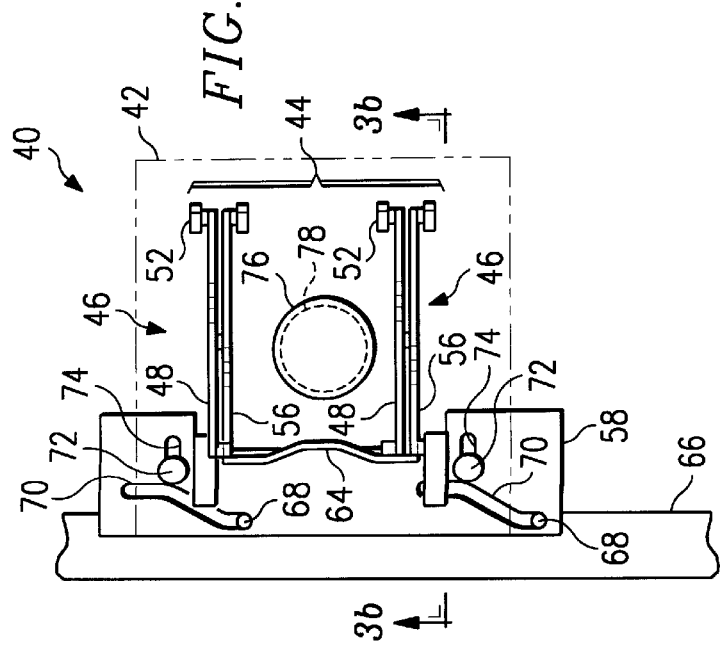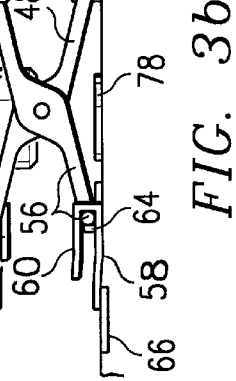

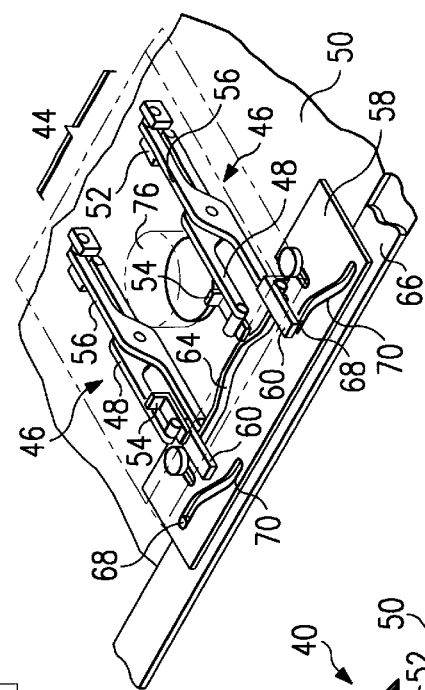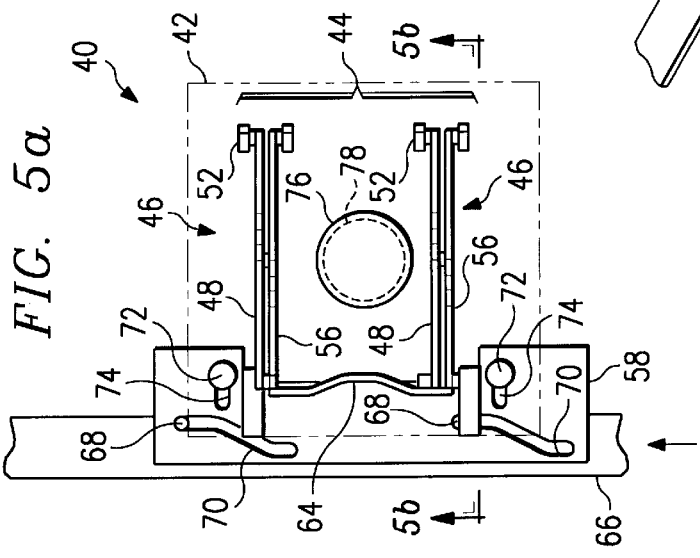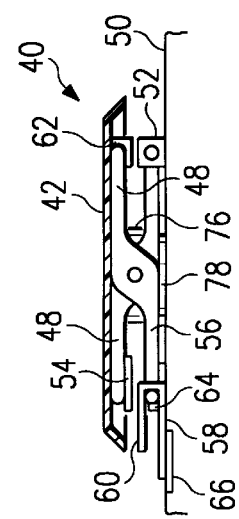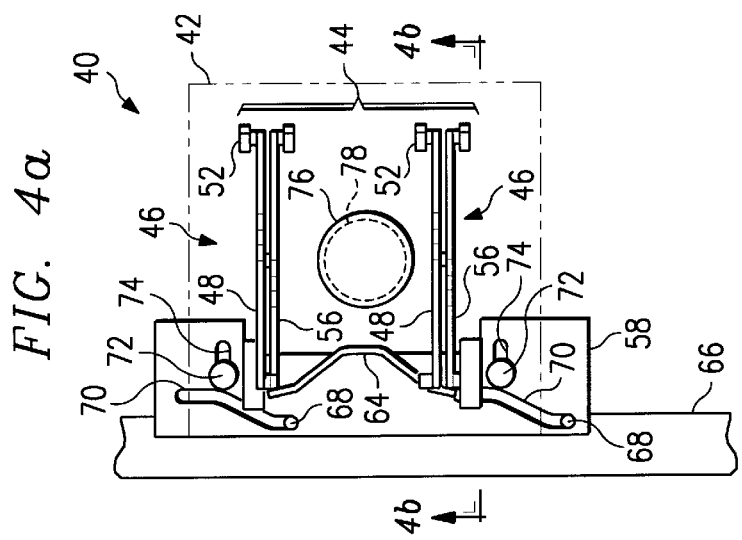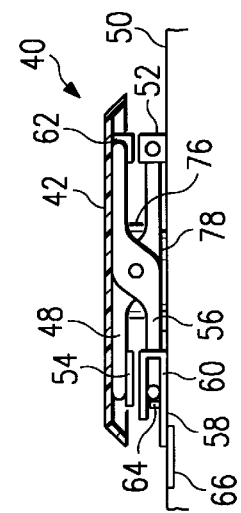

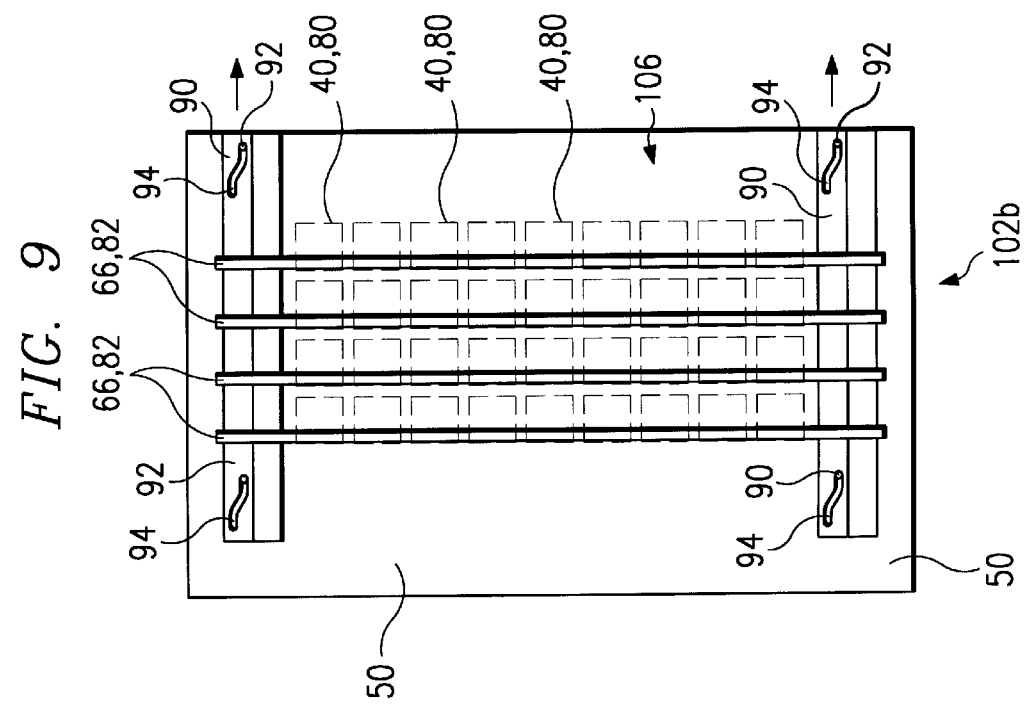
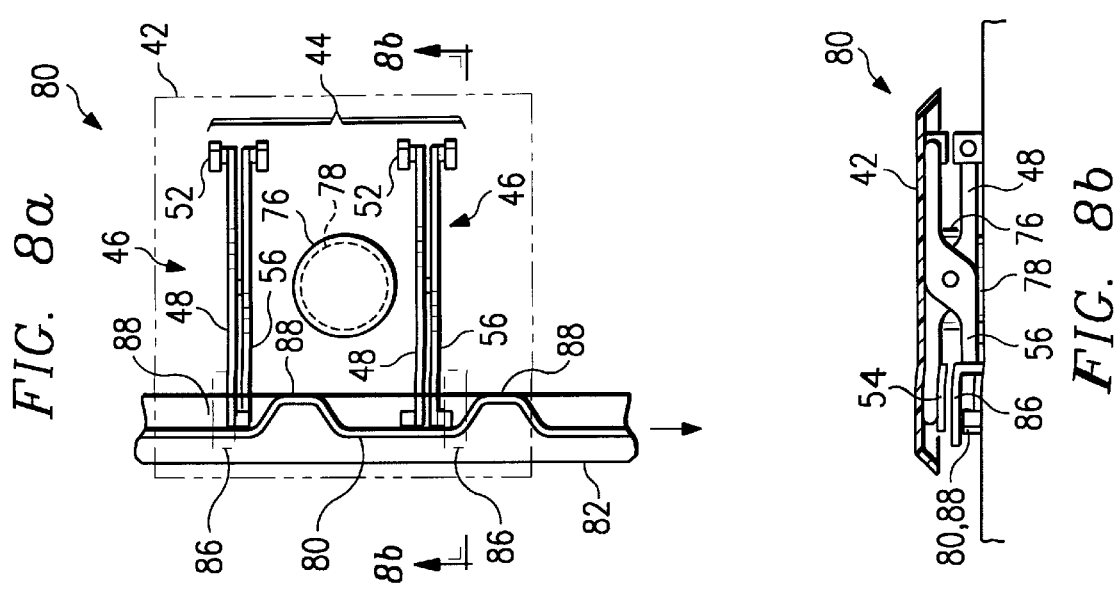

LOW PROFILE KEYBOARD

BACKGROUND OF THE INVENTION

1. Technical Field

This invention relates in general to keyboards and, more particularly, to a low profile keyboard for use in a notebook computer or other electronic device.

2. Description of the Related Art

Since the proliferation of the personal computer as a personal and business tool, portable computers have been in high demand. Portable computer manufacturers are continually refining the portable computers to have a greater number of features while reducing the size and weight of the units.

Very low weight portable computers are referred to as "notebook" computers. At one time, notebook computers were stripped of many features in order to reduce weight and size; however current day notebook computers are full-featured. Weight and size are among the most important factors in selecting a notebook computer. Since a notebook computer is meant to be used in many different locations, the ease with which it can be carried is often determinative of its value.

Many factors contribute to the size and weight of a notebook computer. Improved technology has allowed several components to be reduced in size. For example, hard drives and motherboards can be made much smaller than those of a few years ago. Other components cannot simply be made smaller simply by further miniaturization, because their functionality is dependent upon their size. A good example of such a component is the keyboard, which needs to meet certain physical parameters in order to be comfortable to use.

Keyboards are the user's prime interface for entering information and commands into a computer. It is therefore important to users that the keyboard allow typing at a high speed. A primary consideration in touch typing it the length of the keystroke. The keyboards used with desktop computers is on the order of five millimeters. The keyboard used in a notebook computer, on the other hand, is on the order of three to four millimeters. Accordingly, many portable computer designers provide a port for a full-sized keyboard, either as a port on the notebook computer or as a port on a docking station.

Therefore, a need has arisen in the industry for a portable computer with a thinner keyboard without sacrificing the functionality of the keyboard.

SUMMARY OF THE INVENTION

The present invention provides an electronic device with a low profile key mechanism with full keystroke capability. The portable electronic device comprises a housing for containing processing circuitry with a keyboard having a plurality of keys electrically coupled to said processing circuitry. The keys of the keyboard comprise a keycap, a guide mechanism coupled to the keycap for controlling up and down movements of said keycap responsive to a user pressing and releasing said keycap and a lateral spring for providing a resistive force against said guide mechanism as said key is pressed.

The present invention provides significant advantages over the prior art. By using a lateral spring, the spring can be positioned against the guide mechanism while the keyboard is active to provide a resistive force against a keystroke. When the keyboard is in an inactive state, the lateral spring can be moved laterally, such that the keys are lowered. Thus, the guide mechanism can provide a full keystroke of three to five millimeters while in an active state and reduce its height to approximately two millimeters while in an inactive state. Since the spring moves laterally from the keys, no height is added to the keyboard by virtue of the spring movement.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3a, 3b and 3c illustrate top, cross-sectional side and perspective views a first embodiment of a key mechanism in a normal state;

FIGS. 4a and 4b illustrate top and cross-sectional side views of the first embodiment in a depressed state;

FIGS. 5a, 5b and 5c illustrate top, cross-sectional side and perspective views of the first embodiment in a storage state;

FIGS. 6a and 6b illustrate top and cross-sectional side views of a second embodiment of a key mechanism in a normal state;

FIGS. 7a and 7b illustrate top and cross-sectional side views of the second embodiment in a depressed state;

FIGS. 8a and 8b illustrate top and cross-sectional side views of the second embodiment in a storage state;

FIG. 9 illustrate a mechanism for switching between active and storage states.

DETAILED DESCRIPTION OF THE PREFERRED EMBODIMENT

The present invention is best understood in relation to FIGS. 1–9 of the drawings, like numerals being used for like elements of the various drawings.

Figure 1:
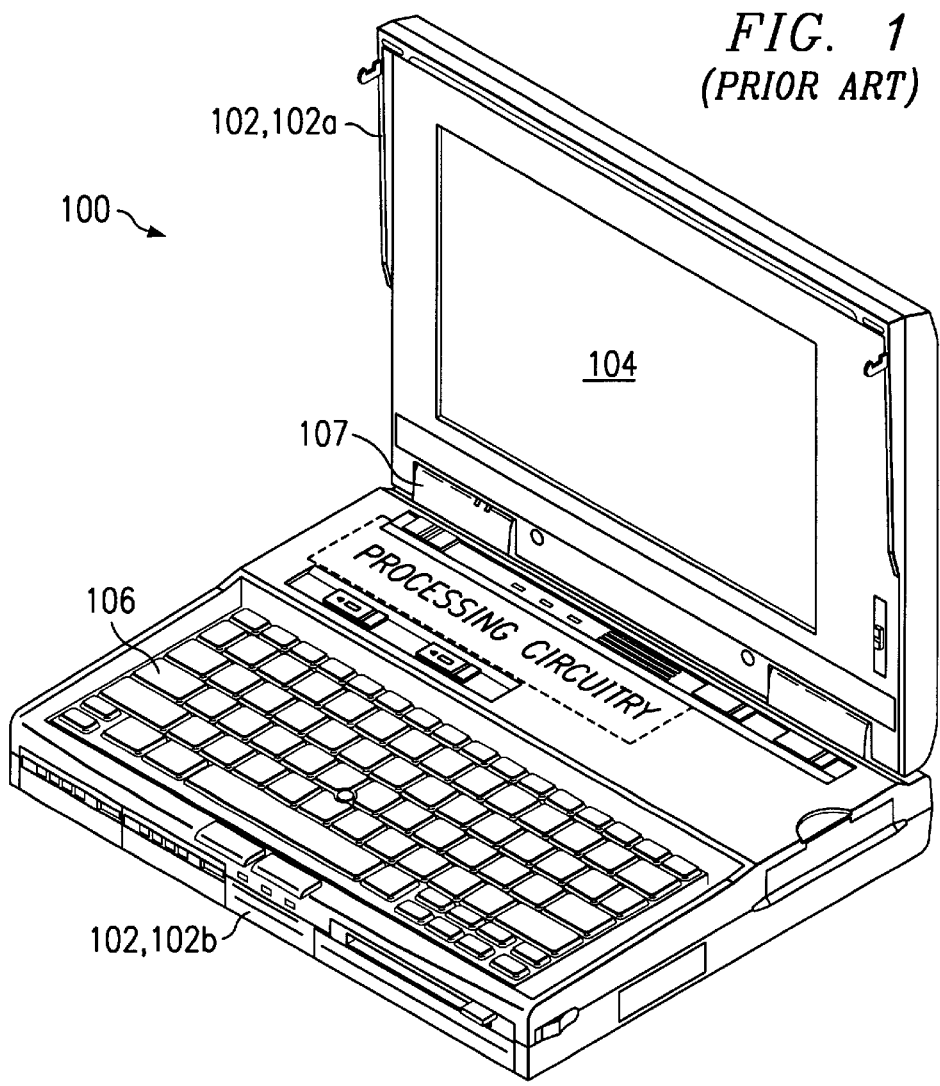
FIG. 1 illustrates a notebook computer.

With reference to FIG. 1, there is shown a prior art portable computer 100 of the type commonly referred to as a notebook computer, or laptop computer. Computer 100 includes a housing 102 which is a clamshell type enclosure which includes a display housing 102a and a main housing 102b. The top housing 102a includes a screen 104, and the main housing 102b has a keyboard 106. The two housings are connected along one edge with a hinge 107 for pivotal movement relative to each other to expose the keyboard and display for use from the closed position. In order to reduce the overall thickness of the combined housings it is desirable to reduce the thickness of the keyboard and its associated housing.

Figure 2:
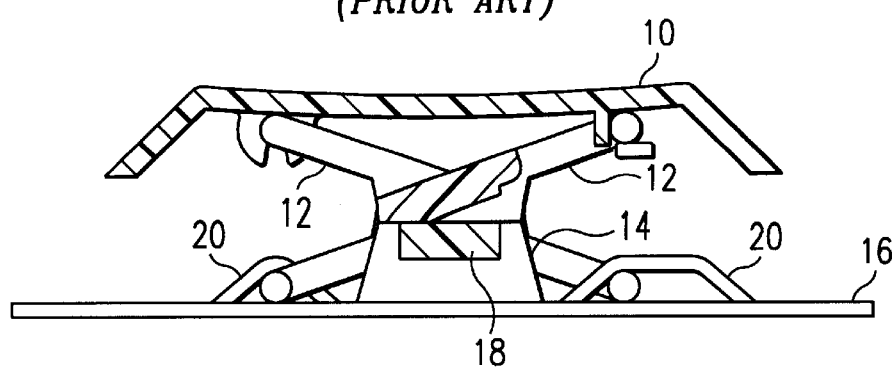
FIG. 2 illustrates a prior art key mechanism.

An example of a prior art keyboard key is illustrated in cross section in FIG. 2. This type of key comprises, a keycap 10, a guide mechanism 12, a flexible dome 14, and a base 16. The keycap 10 is typically formed of a resin with an alphanumeric character stamped or formed on the top, and includes two pairs of engaging members or grooves to secure it to the guide mechanism 12. The guide mechanism is a scissor mechanism as described U.S. Pat. Nos. 5,280,147, 5,278,372 and 5,463,195, all of which are incorporated by reference herein. The guide mechanism 12 presses a rubber spring or flexible dome 14 which has a moveable electrode 18 which makes contact with electrical traces on the base 16 when the key is depressed. The base 16 includes a means for retaining the guide mechanism such as the eyelets 20 as shown. Typically, one of the eyelets will hold one guide mechanism arm stationary, as shown on the left, and another eyelet will slideably retain a second guide mechanism arm, as shown on the right of FIG. 2.

The keyboard key shown in FIG. 2 requires an overall height of approximately seven millimeters to obtain a stroke of three millimeters. The height of the keys, therefore adds a significant amount of height to the bottom housing 102b.

The improvement over the prior art for the instant patent is primarily the ability to reduce the storage height of the key by amount of the key travel. In the prior art, if the key were to be stored in the depressed mode, the rubber spring or flexible dome would be compressed while in the storage mode, resulting in a damaged spring or dome. Also, it is more difficult to compress all the keys simultaneously when the flexible domes are in place. According to the present invention, the key can be more easily stored in a compressed mode without damage to the flexible dome from long term storage.

FIGS. 3a–c, 4a–b and 5a–c illustrate a first embodiment of a key which has a full range keystroke of three millimeters or more, but can be placed in a low profile, storage mode where it has a height of approximately two millimeters. FIGS. 3a, 4a and 5a illustrate a top view, a cross-sectional side view, and a perspective view, respectively, of the key 40 while the key is in the active mode and is in a normal (not depressed) position. FIGS. 3b and 4b illustrate a top view and a cross-sectional side view of the key 40 while it is depressed during a keystroke. FIGS. 3c, 4c and 5c illustrate a top view, a cross-sectional side view and a perspective view, respectively, of the key 40 while the key is in the storage mode.

The key 40 has a keycap 42 which is coupled to the guide mechanism 44. The guide mechanism has two sets of crossing legs 46. Each set 46 comprises a first leg 48, which is pivotally attached to the base 50 at pivot 52 and is slideably attached to keycap 42 in retainer 54, and a second leg 56, which is slideably attached to the plate 58 at retainer 60 and is pivotally attached to keycap 42 in pivot 62.

Lateral spring 64 is coupled to plate 58 and contacts legs 56 in the active mode. Plate 58 can be moved away from legs 56 to place the key in storage mode using control bar 66, which has pins 68 which interact with channels 70. Plate 58 is slideably attached to base 50 through guides 72 attached to base 50 which are positioned through channels 74 in plate 58. A first contact 76 is coupled to the keycap 42 and a second contact 78 is coupled to the base. Electrical connections are made to the second contact 78 to detect keystrokes.

In operation, control bar 66 can change the position of plate 58 between active and storage modes. In active mode, plate 58 is positioned towards the guide mechanism 44, such that spring 64 is in contact with legs 56 while the key is in a normal position, as shown in FIG. 4a–c. In this position, spring 64 keeps the keys 40 in an upright position. As the key is depressed, legs 56 press against spring 64, as shown in FIGS. 4a–b. At the bottom of the keystroke, contact 76 presses against contact 78, causing an electrical signal which indicates that the key 40 was pressed. The spring 64 provides a resistive force against the legs 56 as the key 40 is depressed, and returns the key 40 to its normal position once the key is released.

By sliding the control bar 66 (in the direction of the arrow for the illustrated embodiment of FIGS. 5a), the plate 58 is moved away from the guide mechanism 44. As it is moved away, the resistive force against legs 56 is removed, allowing legs 48 and 56 to collapse to the point where the contacts 76 and 78 meet. It should be noted that there is no pressure being applied to the keycap 42 at this point and therefore there will be no damage to the contacts 76 and 78.

As can be seen, the height of the key in its normal position is independent of the height of the key in its storage position. Therefore, a keyboard for a notebook computer can have the same keystroke depth as a desktop keyboard, yet still have the benefit of a greatly reduced height while the computer has its display housing 102a folded over the main housing 102b.

FIGS. 6a–b and 7a–b illustrate top and cross-sectional side views, respectively, of a second embodiment of a key 80 in normal and depressed states. FIGS. 8a–b illustrate top and cross-sectional side views of the key 80 in storage mode.

Key 80 has a guide mechanism 44 which can be the same as that shown in connection with FIGS. 3–6. The plate 58, and connected parts (spring 64, control bar 66, retainers 60) are replaced with control bar 82 which is coupled to spring 84. Retainers 86, which take the place of retainers 60 in FIGS. 3–5, are coupled to base 50 in this embodiment.

Spring 84 has contact portions 88 which contact the legs 56 while the key 80 is in active mode. In this position, spring 84 keeps the keys 80 in an upright position. As the key 80 is depressed, legs 56 press against spring 64 at the contact portions 88, as shown in FIGS. 7a–b. At the bottom of the keystroke, contact 76 presses against contact 78, causing an electrical signal which indicates that the key was pressed. The spring 84 provides a resistive force against the key as it is depressed, and returns the key 80 to its normal position once the key is released.

By sliding the control bar 82 (in the direction of the arrow for the illustrated embodiment of FIGS. 8a–b), the contact portions 88 can be moved away from the guide mechanism 44. As it is moved away, the resistive force against legs 56 is removed, allowing legs 48 and 56 to collapse to the point where the contacts 76 and 78 meet. By sliding control bar 82 in the opposite direction, the contact portions 88 are pressed against legs 58 so that the keys are returned to a normal state.

Tactile response could be added to the keys in a number of ways. First, the spring itself could be designed to provide the tactile response. Second, the spring could incorporate a flexible dome for providing the tactile response.

FIG. 9 illustrates a mechanism for automatically switching between active and storage states as the notebook computer are open and closed. In this embodiment, control bars 66 or 82 are shifted right or left by arms 90, which are pulled out, or pushed in, as the housings 102a and 102b are folded together or unfolded. As the notebook is unfolded, the arms 90 are pushed inward. Channels 94 and pins 92 cause the arms 90 to also shift in an orthogonal direction, pulling (or pushing) control bars 66 or 82. The control bars 66 or 82 thus disengage the springs from the guide mechanism 44. As the notebook is folded, the arms 90 are pulled outward and also shift in the opposite direction due to channels 94 and pins 92. As the arms 90 shift, control bars 66 and 82 shift accordingly, positioning the spring 64 or 84 toward or away from the guide mechanism 44.

The present invention provides significant advantages over the prior art. By using a lateral spring, the spring can be positioned against the guide mechanism while the keyboard is active to provide a resistive force against a keystroke. When the keyboard is in an inactive state, the lateral spring can be moved laterally from the keys, such that the keys are lowered. Thus, the guide mechanism can provide a full keystroke of three to five millimeters while in an active state and reduce its height to approximately two millimeters while in an inactive state. Since the spring moves laterally from the keys, no height is added to the keyboard by virtue of the spring movement.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A portable electronic device comprising:
   a housing;
   processing circuitry disposed within said housing;
   a keyboard having a plurality of keys electrically coupled to said processing circuitry, said keys each comprising:
      a keycap;
      a guide mechanism, comprising first and second leg members rotatably coupled around an axis point, coupled to said key cap for controlling up and down movements of said keycap responsive to a user pressing and releasing said keycap, said first leg having a first end coupled to a fixed point of rotation on a base and a second end slideably attached to said keycap and said second leg having a first end coupled to a fixed point of rotation on said keycap and a second end slideably attached to said base; and
      a horizontally oriented lateral spring for providing a resistive force against said second end of said second leg.

2. The portable electronic device of claim 1 and further comprising a carrier for selectively disengaging and engaging said lateral spring with said guide mechanism.

3. The portable electronic device of claim 1 wherein said housing comprises a display housing and a main housing connected by a hinge, said keyboard being associated with said main housing.

4. The portable electronic device of claim 3 further including a display associated with said display housing.

5. The portable electronic device of claim 1 wherein said guide mechanism comprises first and second leg members rotatably coupled around an axis point.

6. The portable electronic device of claim 5 wherein said first leg has a first end coupled to a fixed point of rotation on a base and a second end slideably attached to said keycap and wherein said leg has a first end coupled to a fixed point of rotation on said keycap and a second end slideably attached to said base.

7. The portable electronic device of claim 1 wherein said guide mechanism provides a keystroke of 3 millimeters or greater.

8. The portable electronic device of claim 1 wherein said guide mechanism comprises two sets of said first and second leg members.

9. The portable electronic device of claim 8 wherein said horizontally oriented lateral spring provides a resistive force against said second ends of said two second legs of said two sets of said first and second leg members.

10. A portable electronic device comprising:
    a housing;
    processing circuitry disposed within said housing; and
    a keyboard coupled to said processing circuitry comprising a plurality of keys electrically coupled to said processing circuitry, said keys each comprising:
       a keycap;
       a guide mechanism, comprising first and second leg members rotatably coupled around an axis point, coupled to said key cap for controlling up and down movements of said keycap responsive to a user pressing and releasing said keycap, said first leg having a first end coupled to a fixed point of rotation on a base and a second end slideably attached to said keycap and said second leg having a first end coupled to a fixed point of rotation on said keycap and a second end slideably attached to said base;
       a horizontally oriented lateral spring for providing a resistive force against said end of said second leg; and
       a carrier for positioning said lateral spring in a first position in said active mode and a second position in said storage mode.

11. The portable electronic device of claim 10 wherein said housing comprises top and bottom portions connected by a hinge, said keyboard being associated with said bottom portion.

12. The portable electronic device of claim 11 further including a display associated with said top portion.

13. The portable electronic device of claim 10 wherein said guide mechanism provides a keystroke of at least 5 millimeters while said keyboard is in active mode.

14. The portable electronic device of claim 10 wherein said housing comprises display and main housings connected by a hinge, said keyboard being associated with said main housing.

15. The portable electronic device of claim 10 wherein said horizontally oriented lateral spring provides a resistive force against said second ends of said two second legs of said two sets of said first and second leg members.

16. The portable electronic device of claim 10 wherein said guide mechanism comprises two sets of said first and second leg members.

17. The portable electronic device of claim 10 wherein said guide mechanism provides a keystroke of at least 3 millimeters while said keyboard is in active mode.

18. A keyboard, comprising:
    a plurality of keys, each key comprising:
       a keycap;
       a guide mechanism, comprising first and second leg members rotatably coupled around an axis point, coupled to said key cap for controlling up and down movements of said keycap responsive to a user pressing and releasing said keycap, said first leg having a first end coupled to a fixed point of rotation on a base and a second end slideably attached to said keycap and said second leg having a first end coupled to a fixed point of rotation on said keycap and a second end slideably attached to said base;
       a horizontally oriented lateral spring for providing a resistive force against said end of said second leg; and
       a control mechanism coupled to said lateral springs for each key for placing said lateral spring in a first position to configure the keyboard in an active mode and placing said lateral spring in a second position to configure the keyboard in a storage mode.

19. The keyboard of claim 18 wherein said guide mechanism provides a keystroke of 3 millimeters or greater when said lateral spring is in said first position.

20. The keyboard of claim 18 wherein said guide mechanism comprises two sets of said first and second leg members.

* * * * *